US010698851B1

United States Patent
Shr et al.

(10) Patent No.: US 10,698,851 B1
(45) Date of Patent: Jun. 30, 2020

(54) DATA BIT WIDTH CONVERTER AND SYSTEM ON CHIP THEREOF

(71) Applicant: REALTEK SEMICONDUCTOR CORP., Hsinchu (TW)

(72) Inventors: Kai-Ting Shr, Hsinchu (TW); Chia-Wei Yu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/366,139

(22) Filed: Mar. 27, 2019

(30) Foreign Application Priority Data

Dec. 12, 2018 (TW) .............................. 107144882 A

(51) Int. Cl.
*G06F 13/38* (2006.01)
*G06F 13/40* (2006.01)
*G06F 3/06* (2006.01)
*G06F 5/06* (2006.01)

(52) U.S. Cl.
CPC ............ *G06F 13/4018* (2013.01); *G06F 5/06* (2013.01)

(58) Field of Classification Search
CPC ............. G06F 13/40; G06F 3/06; G06F 13/38
See application file for complete search history.

(56) References Cited

U.S. PATENT DOCUMENTS

| 8,595,452 B1 * | 11/2013 | Katzer .................. G06F 3/0607 707/619 |
| 2008/0028197 A1 * | 1/2008 | Sawai ...................... G06F 13/28 712/300 |
| 2011/0078349 A1 * | 3/2011 | Ushigami ............... G06F 13/28 710/105 |
| 2014/0115270 A1 * | 4/2014 | Wu ...................... G06F 13/1689 711/146 |
| 2015/0010005 A1 * | 1/2015 | Yoshida .................. H04L 45/74 370/392 |
| 2017/0097892 A1 | 4/2017 | Gschwind et al. |

FOREIGN PATENT DOCUMENTS

CN 106201945 A 12/2016

* cited by examiner

*Primary Examiner* — David E Martinez
(74) *Attorney, Agent, or Firm* — Birch, Stewart, Kolasch & Birch, LLP

(57) ABSTRACT

A data bit width converter is adapted to: convert first data using a first bit width as a data segment unit and second data using a second bit width as a data segment unit, and provide a cache to temporarily store third data, wherein the first bit width is not equal to the second bit width. The data bit width converter includes a slave, a cache, and a data reconstitution circuit. The slave is configured to read and write the second data. The cache is configured to read and write the third data. The data reconstitution circuit is configured to: convert the first data and the second data, and sequentially search the cache and the slave for the second data according to a searching program, to output the first data, and write the third data to the cache according to a temporary storage program.

10 Claims, 4 Drawing Sheets

DATA BIT WIDTH CONVERTER AND SYSTEM ON CHIP THEREOF

CROSS-REFERENCE TO RELATED APPLICATION

This non-provisional application claims priority under 35 U.S.C. § 119(a) to Patent Application No. 107144882 in Taiwan, R.O.C. on Dec. 12, 2018, the entire contents of which are hereby incorporated by reference.

BACKGROUND

Technical Field

The present disclosure relates to a data bit width converter.

Related Art

Nowadays, due to the diversification of functions of electronic hardware systems, different intellectual property (IP) cores usually need to be combined in the development of a single electronic hardware system. Different IP cores may have different technical specifications. For example, on a block level, different IP cores may have different numbers of input and output ports; and, on a port level, input and output ports of different IP cores may have different bit widths. Therefore, when interconnecting different IP cores or linking IP cores and buses, the electronic hardware system needs to use a data bit width converter as an intermediary to resolve data transmission problem by increasing or decreasing a bit width.

In use of the data bit width converter, a master is usually linked on one end, and a slave is linked on the other end. The master is configured to provide a data reading requirement to the slave, and the slave is configured to provide corresponding data to the master. Because the bit widths of the master and the slave are different, the link between the master and the slave requires the data bit width converter to assist in bit width conversion, so that the master and the slave can perform data transmission. Due to the demand for high-speed computing in today's electronic products, it is necessary to reduce the processing time of the data bit width converter, to improve the speed at which the master reads the slave.

SUMMARY

In view of this, the present disclosure provides a system on a chip (SoC) having a data bit width converter, adapted to: convert first data using a first bit width as a data segment unit and second data using a second bit width as a data segment unit, and provide a cache to temporarily store third data. The SoC includes: a first IP core, a second IP core, and a data bit width converter. The first IP core is configured to carry the first data. The second IP core is configured to carry the second data. The data bit width converter includes a slave, a master, a cache, and a data reconstitution circuit. The slave is configured to read and write the second data. The master is configured to output a control instruction to the data reconstitution circuit to obtain the first data. The cache is configured to read and write the third data. The data reconstitution circuit is configured to: convert the first data and the second data, and sequentially search the cache and the slave for the second data according to a searching program, to output the first data, and write the third data to the cache according to a temporary storage program. After the second data is converted into the first data, a remaining part of the second data is the third data.

According to some embodiments, the searching program includes: obtaining a plurality of indexes and a plurality of tags according to the first bit width of the first data, a first address, the number of first data segments, and the second bit width of the second data, a second address, and the number of second data segments; and searching the cache for the second data according to the indexes and the tags; if the complete second data is obtained, stopping the searching program, and otherwise, continuing to search the slave for the second data, where when any part of the second data is obtained from the cache, a block corresponding to the cache is erased.

According to some embodiments, the temporary storage program includes: obtaining the third data and the corresponding at least one index and the at least one tag according to the first bit width of the first data, the first address, the first data segments, and the second bit width of the second data, the second address, and the second data segments, where the third data includes only the second data segments that are not completely used by the first data; and writing the third data to the cache according to the at least one index and the at least one tag.

According to some embodiments, the temporary storage program includes: obtaining the third data and the corresponding at least one index and the at least one tag according to the first bit width of the first data, the first address, the first data segments, and the second bit width of the second data, the second address, and the second data segments, where the third data includes only a bit of the second data that is not used by the first data; and writing the third data to the cache according to the at least one index and the at least one tag.

Based on the above, the data bit width converter can convert the first data and the second data that have different bit widths, and can provide a cache to temporarily store the third data. The third data is a remaining part of the second data after the second data is converted into the first data. Therefore, the data bit width converter can avoid repeatedly reading some of the second data, to reduce processing time for conversion on the first data and the second data.

DETAILED DESCRIPTION

Figure 1:
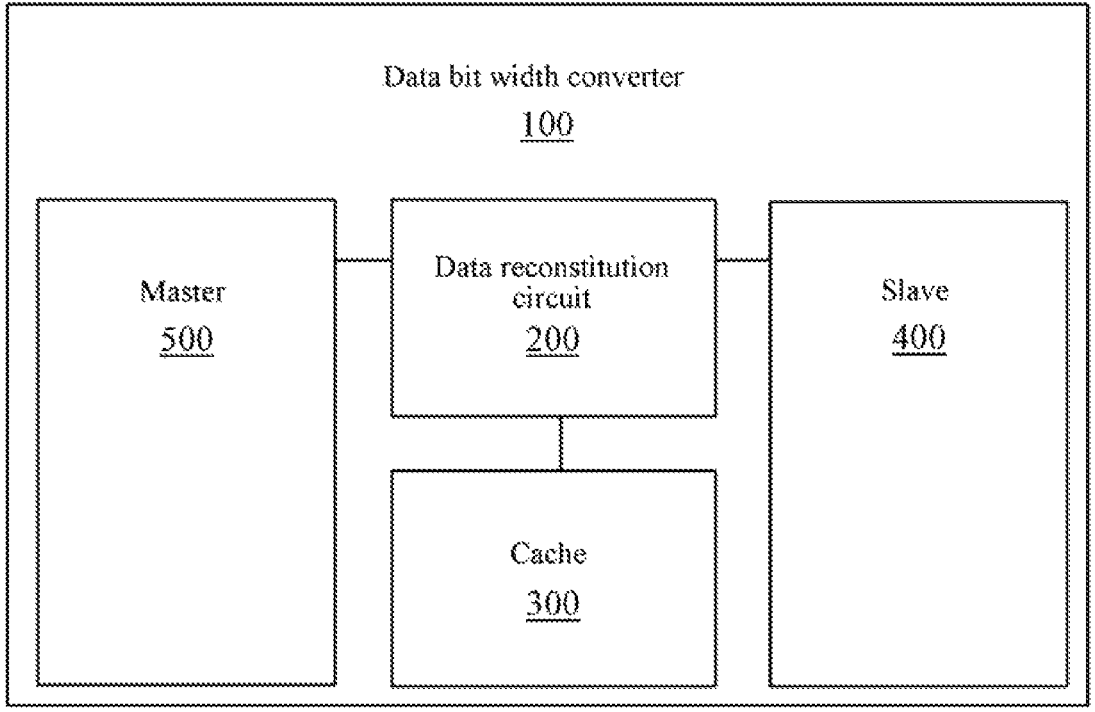
FIG. 1 is a schematic diagram of a data bit width converter according to some embodiments of the present disclosure.

FIG. 1 is a schematic diagram of a data bit width converter 100 according to some embodiments of the present disclosure. The data bit width converter 100 includes a data reconstitution circuit 200, a cache 300, a slave 400, and a master 500.

The data bit width converter 100 is configured to: convert data into another data having a different bit width, and provide a cache to temporarily store data. Data is usually a long string of data, but a solid state disk or a memory configured to store data, or a data processing apparatus cannot process entire data at a time due to a length limitation, and can process data having one bit width length only at a time. Therefore, by using the bit width length of processing by the foregoing hard disk, memory, or apparatus at a time, the data is equally divided into a plurality of data segments, and a data segment unit is hereinafter referred to as a bit width length unit. Therefore, accordingly, to correspond to different hard disks, memories, or apparatuses, the data has different data segment units, and then is equally divided into a plurality of data segments according to the data segment units.

In specific use, the data bit width converter 100 is adapted to convert first data D1 using a first bit width as a data segment unit and second data D2 using a second bit width as a data segment unit, where the size of the first bit width is different from that of the second bit width. It should be particularly noted that a final objective of the data bit width converter 100 is to obtain the first data D1, but the data bit width converter 100 has only related information about the first bit width, the second bit width, and the first data D1, for example, an address and the number of data segments from the beginning. Therefore, the data bit width converter 100 needs to first convert the foregoing information into related information about the second data D2, and read the second data D2 according to the related information about the second data D2. When obtaining the complete second data D2, the data bit width converter 100 converts the second data D2 to obtain the first data D1, where the second D2 needs to include all content of the first data Dl. Because the data segment unit of the first data D1 is different from that of the second data D2, some of the second data D2 is not converted into the first data D1, and second data D2 that is not converted into the first data D1 is hereinafter referred to as third data D3. To avoid repeatedly reading some of the second data D2, the data bit width converter 100 provides a cache to temporarily store the third data D3, to reduce processing time of the data bit width converter 100.

In some embodiments, the data bit width converter 100 is disposed in a display adapter, the Ethernet, a direct memory access (DMA) controller, the Peripheral Component Interconnect Express (PCI-E), a serial peripheral interface (SPI), a peripheral input/output (I/O), or between IP cores. However, in some other embodiments, the data bit width converter 100 may be further integrated into an SoC.

In some embodiments, an SoC having a data bit width converter includes a first IP core, a second IP core, and a data bit width converter 100. The first IP core is configured to carry the first data D1 using a first bit width as a data segment unit between the data bit width converter 100 and a first external device. An operating environment of the first external device usually uses the first bit width as a data segment unit. Similarly, the second IP core is configured to carry the second data D2 using a second bit width as a data segment unit between the data bit width converter 100 and a second external device. An operating environment of the second external device usually uses the second bit width as a data segment unit.

The first external device and the second external device may be the foregoing display adapter, the Ethernet, the DMA controller, the PCI-E, the SPI, or the peripheral I/O.

Continuing to refer to FIG. 1, in some embodiments, the master 500 is configured to output a control instruction (not shown) to the data reconstitution circuit 200 to obtain the first data D1. The slave 400 is configured to read and write the second data D2. The cache 300 is configured to read and write the third data D3. The data reconstitution circuit 200 is configured to convert the first data D1 and the second data D2. The master 500 and the slave 400 have a master/slave relationship. That is, master is the master 500, and slave is the slave 400. To be specific, the master 500 outputs a control instruction to the data reconstitution circuit 200, and sends a requirement to the slave 400 by using the data reconstitution circuit 200, to obtain the first data D1. The slave 400 provides the corresponding second data D2 in response to the requirement of the mater 500, and converts the second data D2 into the first data D1 by using the data reconstitution circuit 200, and then outputs the second data D2 to the master 500 by using the data reconstitution circuit 200.

As can be learned from the foregoing descriptions that the data reconstitution circuit 200 for relaying has a transfer function and a conversion function. With respect to the transfer function, the data reconstitution circuit 200 is responsible for transferring the requirement of the master 500 to the slave 400 and transferring the response of the slave 400 to the master 500. With respect to the conversion function, the data reconstitution circuit 200 is configured to convert the first data D1 and the second data D2, particularly, convert the second data D2 into the first data D1, and then is configured to subsequently output the second data D2 back to the master 500. The conversion function of the data reconstitution circuit 200 further includes converting the related information about the first data D1 and the related information about the second data D2, particularly, converting the related information about the first data D1 into the related information about the second data D2, to facilitate subsequent searching for the second data D2.

Based on the above, it should be particularly noted that the data reconstitution circuit 200 further has a searching function, a sorting function, and a temporary storage function. With respect to the searching function, the data reconstitution circuit 200 sequentially searches the cache 300 and the slave 400 for the second data D2 according to a searching program. With respect to the sorting function, the data reconstitution circuit 200 resorts the second data D2 read from the cache 300 and the slave 400. With respect to the temporary storage function, the data reconstitution circuit 200 writes the third data D3 into the cache 300 according to a temporary storage program. After the second data D2 is converted into the first data D1, a remaining part of the second data D2 is the third data D3.

Figure 2:
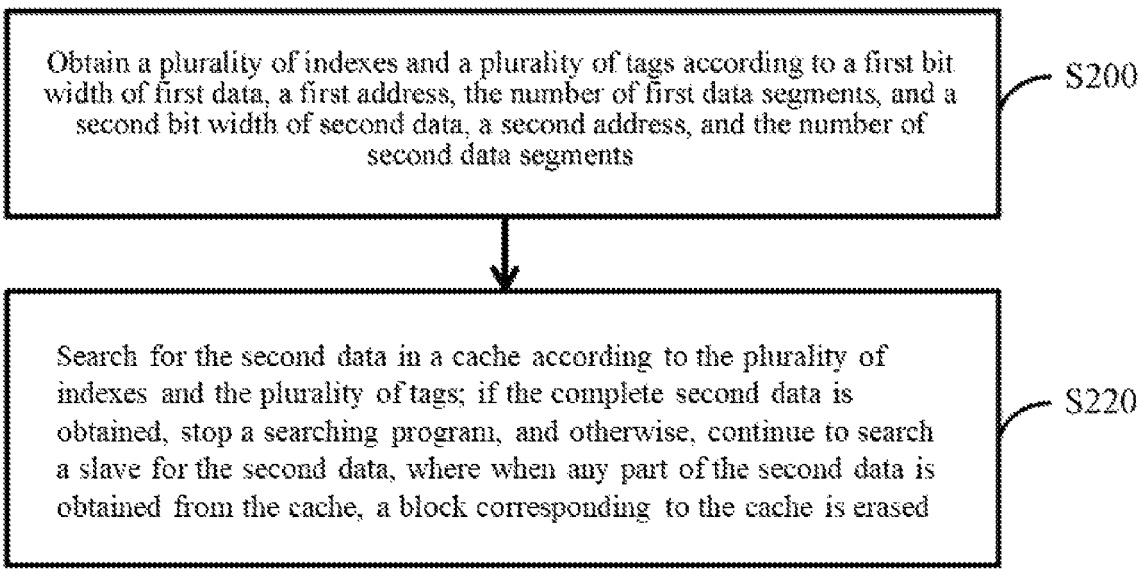
FIG. 2 is a flowchart of a searching program according to some embodiments of the present disclosure.

FIG. 2 is a flowchart of a searching program according to some embodiments of the present disclosure. Referring to FIG. 2, the searching program includes the following steps:

Step S200: Obtain a plurality of indexes 340 and a plurality of tags 360 according to a first bit width of first data D1, a first address, the number of first data segments D10, and a second bit width of second data D2, a second address, and the number of second data segments D20.

Step S220: Search for the second data D2 in a cache 300 according to the plurality of indexes 340 and the plurality of tags 360; if the complete second data D2 is obtained, stop a searching program, and otherwise, continue to search a slave 400 for the second data D2, where when any part of the second data D2 is obtained from the cache 300, a block corresponding to the cache 300 is erased.

Figure 3A:
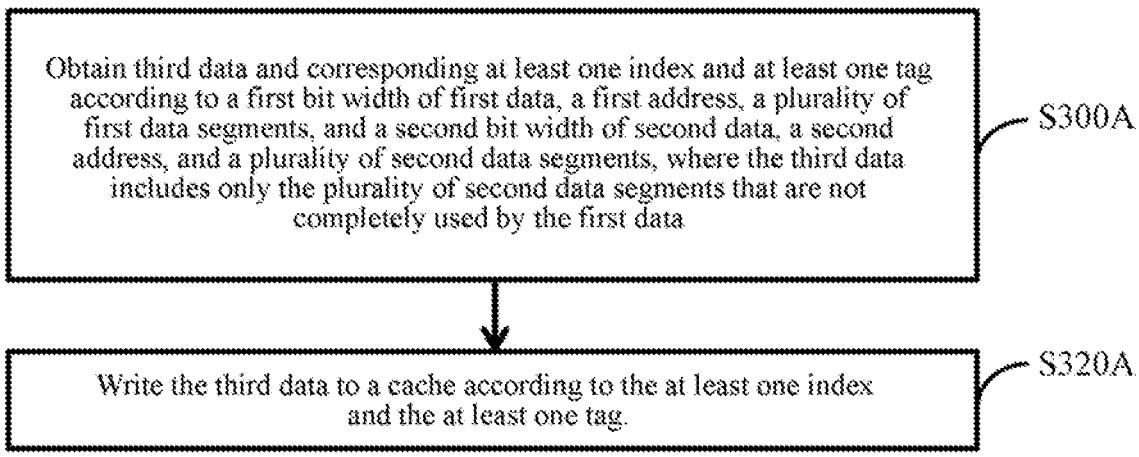
FIG. 3A is a flowchart of a temporary storage program according to some embodiments of the present disclosure.

FIG. 3A is a flowchart of a temporary storage program according to some embodiments of the present disclosure. Referring to FIG. 3A, the temporary storage program includes the following steps:

Step S300A: Obtain third data D3 and corresponding at least one index 340 and at least one tag 360 according to a first bit width of first data D1, a first address, a plurality of first data segments D10, and a second bit width of second data D2, a second address, and a plurality of second data segments D20, where the third data D3 includes only the plurality of second data segments D20 that are not completely used by the first data Dl.

Step S320A: Write the third data D3 to a cache 300 according to the at least one index 340 and the at least one tag 360.

Figure 3B:
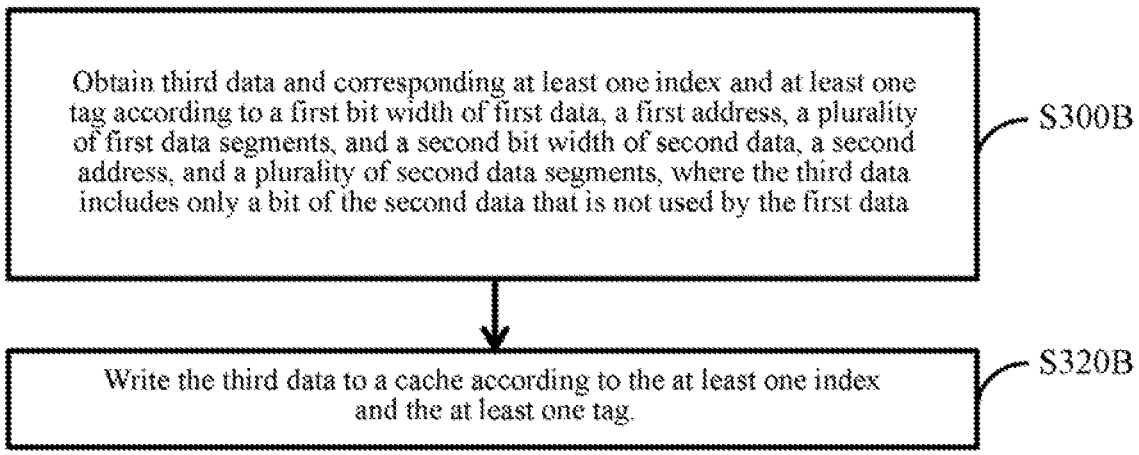
FIG. 3B is a flowchart of a temporary storage program according to some other embodiments of the present disclosure.

FIG. 3B is a flowchart of a temporary storage program according to some other embodiments of the present disclosure. Referring to FIG. 3B, the temporary storage program includes the following steps:

Step S300B: Obtain third data D3 and corresponding at least one index 340 and at least one tag 360 according to a first bit width of first data D1, a first address, a plurality of first data segments D10, and a second bit width of second data D2, a second address, and a plurality of second data segments D20, where the third data D3 includes only a bit of the second data D2 that is not used by the first data Dl.

Step S320B: Write the third data D3 to a cache 300 according to the at least one index 340 and the at least one tag 360.

Figure 4A:
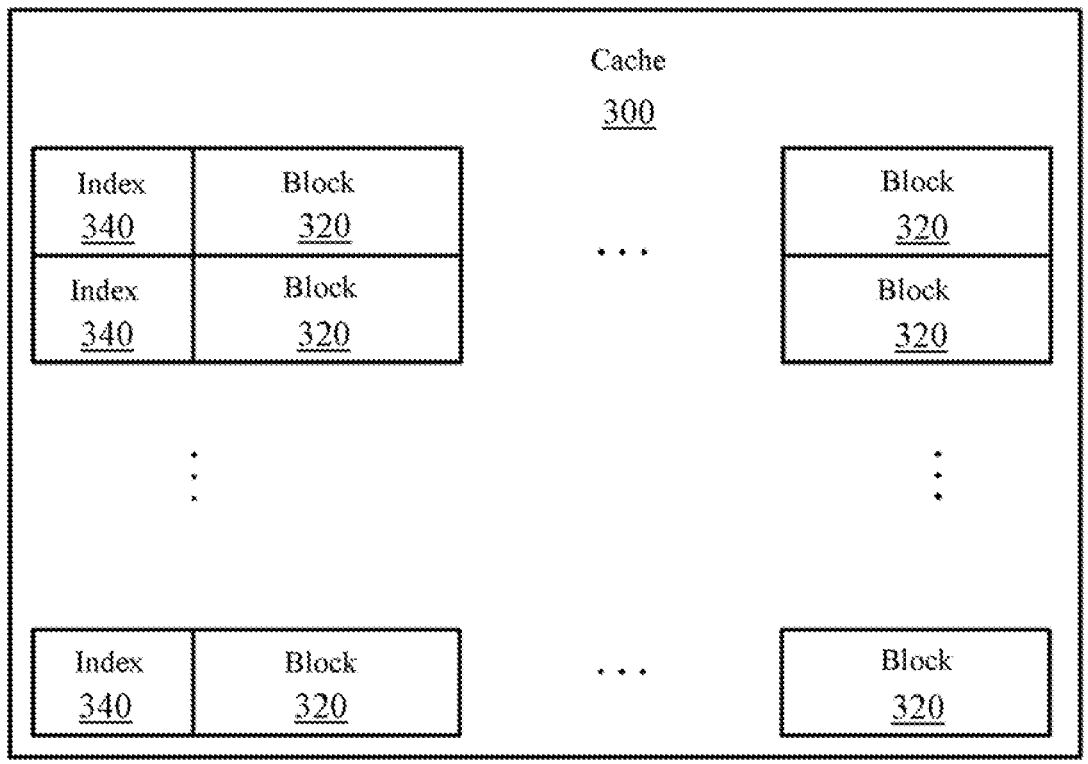
FIG. 4A is a schematic diagram of a cache according to some embodiments of the present disclosure.

FIG. 4A is a schematic diagram of a cache 300 according to some embodiments of the present disclosure. The cache 300 includes a plurality of blocks 320 and a plurality of indexes 340. The blocks 320 are arranged in an array manner and are configured to temporarily store data. The indexes 340 are disposed, so that a data reconstitution circuit 200 can quickly find required blocks 320 when writing or reading the cache 300. In use, blocks 320 located on a same row correspond to a same index 340, and each row has a same number of blocks 320, and blocks 320 of each row correspond to a dedicated index 340 of each row (for example, the cache 300 has 16 rows, and indexes 340 correspond to the rows from top to bottom are respectively represented as "0000" to "1111" in a binary form, equivalent to "0" to "15" in a decimal form).

Figure 4B:
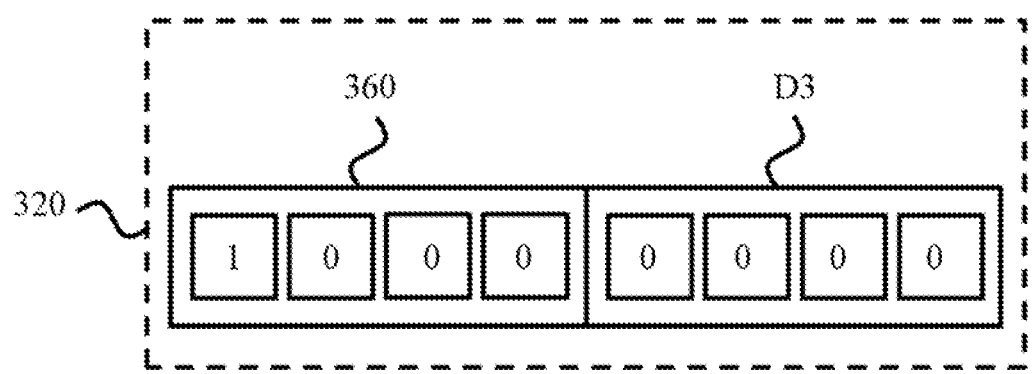
FIG. 4B is a schematic diagram of blocks according to some embodiments of the present disclosure.

FIG. 4B is a schematic diagram of blocks 320 according to some embodiments of the present disclosure. Data that can be temporarily stored in each block 320 includes third data D3 and a tag 360. The third data D3 is a remaining part of second data D2 after the second data D2 is converted into the first data D1. Therefore, an address of second data D2 of a part corresponding to the third data D3 is used as the tag 360 (for example, as shown in FIG. 4B, content of the tag 360 is "1000", and content of the third data D3 is "0000").

When reading the third data D3 from a cache 300, a data reconstitution circuit 200 first searches, according to an index 340 corresponding to a second address, for all blocks 320 in a row corresponding to the index 340, and then compares, sequentially from left to right according to the tag 360 corresponding to the second data D2, whether there is a consistent tag 360 in the blocks. It should be particularly noted that when finding, through comparison, that there is a consistent tag 360 in a block 320, the data reconstitution circuit 200 reads third data D3 in the block 320 having the consistent tag 360, and erases data of the block 320 in which the third data D3 having the consistent tag 360 is located, so that the block 320 is restored into a status having no temporarily stored data.

When writing the third data D3 to the cache 300, the data reconstitution circuit 200 first determines, according to the index 340 corresponding to the third data D3, a row of blocks 320 into which the data is written, and sequentially writes the third data D3 into the blocks 320 from left to right. It should be particularly noted that the data reconstitution circuit 200 skips a block 320 having temporarily stored data, and writes the third data D3 into a next block 320 having no temporarily stored data. When a same row of blocks 320 all have temporarily stored data, the data reconstitution circuit 200 does not skip the blocks 320 having temporarily stored data, and sequentially stores the third data D3 into the blocks 320 from left to right.

Figure 5:
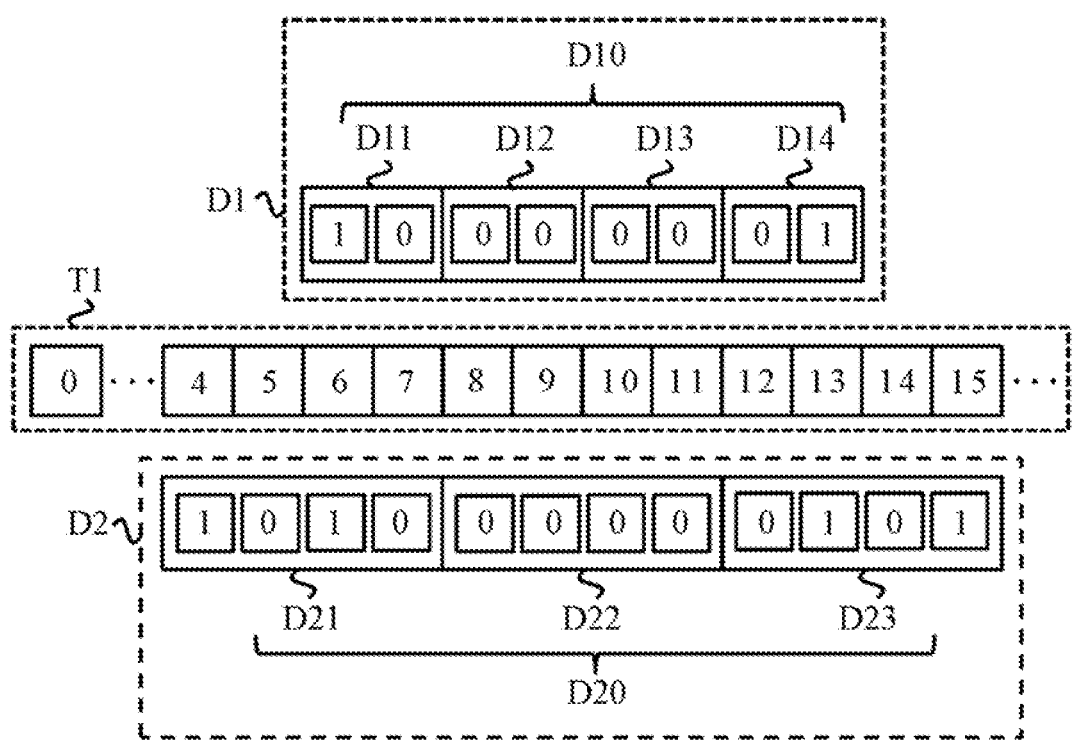
FIG. 5 is a schematic diagram of bit width conversion according to some embodiments of the present disclosure.

FIG. 5 is a schematic diagram of bit width conversion according to some embodiments of the present disclosure. In some embodiments, a first bit width is "2", a second bit width is "4", content of first data D1 is "10000001", and content of second data D2 is "101000000101". The first data D1 includes four first data segments D10, which are respectively the 1st first data segment D11, the 2nd first data segment D12, the 3rd first data segment D13, and the 4th first data segment D14. The second data D2 includes three second data segments D20, which are respectively the 1st second data segment D21, the 2nd second data segment D22, and the 3rd second data segment D23.

Based on the above, an address schematic table T1 is only used to indicate addresses corresponding to the first data D1, the second data D2, the first data segments D10, the second data segments D20, bits in the first data D1, and bits in the second data D2. A first address (that is, an address of the first data D1) is "6", a second address (that is, an address of the second data D2) is "4", an address of the 2nd first data segment D12 is "8", and an address of the 2nd second data segment D22 is "8", and so on. Details are not described below.

When bit width conversion is performed on the first data D1 and the second data D2, the data reconstitution circuit 200 copies, in a one-to-one form in the second data D2, data from bits having same addresses as addresses corresponding to the bits in the first data D1 (for example, as shown in FIG. 5, the addresses corresponding to the bits in the first data D1 are "6" to "13", and therefore, the data reconstitution circuit 200 copies data from bits having addresses "6" to "13" in the second data D2, and therefore, content of the first data D1 is "10000001").

Specifically, a final objective of the data reconstitution circuit 200 is to output the first data D1, but the data reconstitution circuit 200 has only the first bit width, the second width, the first address, and the number of the first data segments D10 from the beginning. Therefore, the data bit width converter 100 needs to first convert the foregoing information into the second address and the number of the second data segments D20 (for example, as shown in FIG. 5, the first bit width is "2", the second bit width is "4", the first address is "6", and the number of the first data segments D10 is four. Therefore, the second address into which the information is converted by the data bit width converter is "4" and the number of the second data segments D20 is three). In some embodiments, the data reconstitution circuit 200 obtains the first address and the number of the first data segments D10 according to the control instruction output by the master 500.

According to the second address and the number of the second data segments D20, the data reconstitution circuit 200 first searches the cache 300 to find whether there is consistent third data D3, particularly searches for only blocks 320 in a row corresponding to an index 340 having a value the same as that of the second address (for example, as shown in FIG. 5, the second address is "4", and blocks 320 in a fifth row corresponding to an index 340 whose value is "4" are searched for). Because data temporarily stored in the blocks 320 includes tags 360, the data reconstitution circuit 200 further compares, one by one, data of the blocks 320 located in the foregoing row, to confirm whether there is a tag consistent with the tag 360 corresponding to each second data segment D20. In some embodiments, tags 360 corresponding to the second data segments D20 are respective addresses of the second data segments D20 (for example, the second address is "4", there are three second data segments D20, and therefore addresses of the second data segments D20 are sequentially "4, 8, 12", and tags 360 corresponding to the second data segments D20 are sequentially "0100, 1000, 1100"; the data reconstitution circuit 200 compares, one by one, the blocks 320 located in the fifth row, to confirm whether there is an address consistent with the address of each second data segment D20).

If the data reconstitution circuit 200 does not obtain the complete second data D2 from the cache 300, the data reconstitution circuit 200 changes to search a slave 400 for remaining second data D2 according to the second address and the number of the second data segments D20 (continuing to make descriptions by using the foregoing example; continuing to refer to FIG. 5, the second address is "4", and three second data segments D20 are needed, where the 2nd second data segment D22 has been obtained from the cache 300). Therefore, the data reconstitution circuit 200 only needs to search the slave 400 for the remaining two second data segments D20. If data content in the slave 400 is "11111010000001010000 . . . ", the remaining two second data segments D20 are obtained as "1010" and "0101" respectively.

When the data reconstitution circuit 200 has obtained the complete second data D2 from the cache 300 or the slave 400, the data reconstitution circuit 200 rearranges the second data D2 read by a controlled end or the cache 300, so that the second data D2 is sorted in a manner conforming to the requirement of the first data D1. After the second data D2 is sorted, the data reconstitution circuit 200 converts the second data D2 into the first data D1, and transmits the first data D1 back to the master 500 (continuing to make descriptions by using the foregoing example; continuing to refer to FIG. 5, the three second data segments D20 respectively include the 2nd second data segment D22 that is obtained from the cache 300 and whose content is "0000", the 1st second data segment D21 that is obtained from the slave 400 and whose content is "1010", and the 3rd second data segment D23 that is obtained from the slave 400 and whose content is "0101". The foregoing three second data segments D20 resorted by the data reconstitution circuit 200 are the sorted second data D2 whose content is "101000000101". A first bit width is "2", a second bit width is "4", related information about the first data D1 is that the first address is "6" and four first data segments D10, and related information about the corresponding second data D2 is that the second address is "4" and three second data segments D20. Therefore, the data reconstitution circuit 200 converts the second data D2 whose content is "101000000101" into the first data D1 whose content is "10000001", and transmits the first data D1 back to the master 500).

After the second data D2 is converted into the first data D1, some of the second data segments D20 are not completely converted into the first data D1, and a remaining part of the second data D2 is the third data D3. In some embodiments, the third data D3 includes only a plurality of second data segments D20 that are not completely used by the first data D1 (continuing to make descriptions by using the foregoing example; continuing to refer to FIG. 5, the second data D2 consists of the three second data segments D20, which are respectively "1010", "0000", and "0101", and the 1st second data segment D21 whose content is "1010" and the 3rd second data segment D23 whose content is "0101" are not completely used by the first data D1. Therefore, the 1st second data segment D21 whose content is "1010" and the 3rd second data segment D23 whose content is "0101" are the third data D3 that needs to be temporarily stored).

After obtaining the third data D3, the data reconstitution circuit 200 obtains corresponding at least one index 340 and at least one tag 360 according to the third data D3. According to the index 340 and the tag 360, the data reconstitution circuit 200 writes the third data D3 to the corresponding cache 300 (continuing to make descriptions by using the foregoing example; referring to FIG. 4A, FIG. 4B, and FIG. 5 at the same time, because the third data D3 is the 1st second data segment D21 whose content is "1010" and the 3rd second data segment D23 whose content is "0101". An address of the 1st second data segment D21 is the second address. Therefore, the address of the 1st second data segment D21 is "0100" (corresponding to "4" of a decimal system), and a tag 360 corresponding to the 1st second data segment D21 is "0100". An address of the 3rd second data segment D23 is the second address plus data lengths of the previous two second data segments D20. Therefore, the address of the 3rd second data segment D23 is "1100" (corresponding to "12" of a decimal system), and a tag 360 corresponding to the 3rd second data segment D23 is "1100". The second address corresponding to the third data D3 is "0". Therefore, the third data D3 is written into two blocks 320 in a first row corresponding to an index 340 having a value of "0", and is written as "01001010" and "11000101" respectively.

The foregoing example is applied to a case in which the third data D3 includes only a plurality of second data segments D20 that are not completely used by the first data D1.

Referring to FIG. 5, in an embodiment, the third data D3 includes only a bit of the second data D2 that is not used by the first data D1. The data reconstitution circuit 200 reads the third data D3 from the cache 300 as follows. The first bit width is "2" (that is, two bits), the second bit width is "4" (that is, four bits), and the related information about the first data D1 is that the first address is "6" and four first data segments D10. The related information about the corresponding second data D2 is that the second address is "4" and three second data segments D20. It is obtained that the address of the 1st second data segment D21 is "4", the address of the 2nd second data segment D22 is "8", and the address of the 3rd second data segment D23 is "12".

Based on the above, the third data D3 includes only a bit of the second data D2 that is not used by the first data D1, the second bit width is twice the first bit width, and each second data segment D20 further needs to be equally divided into two first data segments D10 to obtain another three addresses. Therefore, the addresses of the foregoing three second data segments D20 further need to be added by a data length of a respective first bit width to obtain the another three address "6", "10", and "14". Tags 360 corresponding to the foregoing six addresses are respectively "0100"

(corresponding to "4" in a decimal system), "0110" (corresponding to "6" in a decimal system), "1000" (corresponding to "8" in a decimal system), "1010" (corresponding to "10" in a decimal system), "1100" (corresponding to "12" in a decimal system), and "1110" (corresponding to "14" in a decimal system). Therefore, the data reconstitution circuit 200 first searches for blocks 320 in a fifth row corresponding to an index 340 having a value of "4" according to the second address, and then compares, according to corresponding tags 360 (the corresponding tags 360 are respectively "0100", "0110", "1000", "1010", "1100", and "1110"), whether there is a consistent tag 360 in the blocks of the fifth row sequentially from left to right.

Assuming that content temporarily stored in one of the blocks 320 of the fifth row is "101000" (content of the tag 360 is "1010", and content of the third data D3 is "00"), because the tag 360 in the block 320 corresponds to the tag 360 corresponding to the foregoing address, the data reconstitution circuit 200 reads the third data D3, and erases data of a block 320 in which the third data D3 is located, and restores the block 320 into a status having no temporarily stored data.

Continuing to refer to FIG. 5, in an embodiment, the third data D3 includes only a bit of the second data D2 that is not used by the first data D1. The data reconstitution circuit 200 writes the third data D3 to the cache 300 as follows. The second data D2 is "101000000101", the second address is "4", and the first data D1 into which the second data D2 is converted is "10000001". A beginning of the second data D2 whose content is "10" and a tail of the second data D2 whose content is "01" are bits of the second data D2 that are not used by the first data D1. Therefore, the beginning of the second data D2 whose content is "10" and the tail of the second data D2 whose content is "01" are the third data D3 that needs to be temporarily stored.

Based on the above, because an address of the beginning of the second data D2 is the second address, the address of the beginning of the second data D2 is "0100" (corresponding to "4" in a decimal system), and a tag 360 of the beginning of the second data D2 is "0100". An address of the tail of the second data D2 is the second address plus a data length of the second data D2 minus a data length of the tail 01 of the second data D2. Therefore, the address of the tail of the second data D2 is "1110" (corresponding to "14" in a decimal system), and a tag 360 of the tail of the second data D2 is "1110". The second address corresponding to the third data D3 is "4". Therefore, the third data D3 is written into two blocks 320 in a fifth row corresponding to an index 340 having a value of "4", and is written as "010010" and "111001" respectively.

In some embodiments, a data address range applicable to the data bit width converter 100 is "1048576". The data address range indicates a range in which the slave 400 reads and writes the second data D2. In other words, the slave 400 can read and write the second data D2 only in the data address range. The first bit width is "16", and the second bit width is "80". In the cache 300, there are 128 rows of indexes 340, and there are "4" blocks 320 in each row. In each block 320, a length of the tag 360 is "9", and a length of the third data D3 is "64". Therefore, the size for temporarily storing the third data D3 of the cache 300 is a total of "32768". When the data bit width converter 100 conducts a test by reading the first data D1 for 10000 times, a data volume of the second data D2 obtained by the slave 400 is "565280". The data volume represents a length sum of second data D2 obtained each time. For a data bit width converter 100 that does not use a cache 300, when the data bit width converter 100 conducts a test by reading the first data D1 for 10000 times, a data volume of the second data D2 obtained by the slave 400 is "800000". Therefore, after the cache 300 is used, the data volume of the slave 400 is reduced by 29.34%. In other words, the data reconstitution circuit 200 changes to obtain the 29.34% data volume from the cache 300. Because a read and write speed of the cache 300 is greater than that of the slave 400, processing time of the data bit width converter 100 is reduced.

Based on the above, the data bit width converter can convert the first data D1 and the second data D2 that have different bit widths, and can provide a cache to temporarily store the third data D3. The third data D3 is a remaining part of the second data D2 after the second data D2 is converted into the first data D1. Therefore, the data bit width converter 100 can avoid repeatedly reading some of the second data D2, to reduce processing time for conversion on the first data D1 and the second data D2.

What is claimed is:

1. A system on a chip (SoC) having a data bit width converter, comprising:
   a first intellectual property (IP) core, configured to carry first data using a first bit width as a data segment unit;
   a second IP core, configured to carry second data using a second bit width as a data segment unit, wherein the second bit width is not equal to the first bit width; and
   a data bit width converter, comprising:
   a slave, configured to read and write the second data;
   a cache, configured to read, write, and temporarily store third data; and
   a data reconstitution circuit, configured to: convert the first data and the second data, and sequentially search the cache and the slave for the second data according to a searching program, to output the first data, and write the third data to the cache according to a temporary storage program, wherein after the second data is converted into the first data, a remaining part of the second data is the third data.

2. The SoC having a data bit width converter according to claim 1, wherein the data bit width converter further comprises a master, configured to output a control instruction to the data reconstitution circuit to obtain the first data.

3. The SoC having a data bit width converter according to claim 2, wherein the searching program comprises:
   obtaining a plurality of indexes and a plurality of tags according to the first bit width of the first data, a first address, the number of first data segments, and the second bit width of the second data, a second address, and the number of second data segments; and
   searching the cache for the second data according to the indexes and the tags; if the complete second data is obtained, stopping the searching program, and otherwise, continuing to search the slave for the second data, wherein when any part of the second data is obtained from the cache, a block corresponding to the cache is erased.

4. The SoC having a data bit width converter according to claim 3, wherein the temporary storage program comprises:
   obtaining the third data and the corresponding at least one index and the at least one tag according to the first bit width of the first data, the first address, the first data segments, and the second bit width of the second data, the second address, and the second data segments, wherein the third data comprises only the second data segments that are not completely used by the first data; and writing the third data to the cache according to the at least one index and the at least one tag.

5. The SoC having a data bit width converter according to claim 3, wherein the temporary storage program comprises:
obtaining the third data and the corresponding at least one index and the at least one tag according to the first bit width of the first data, the first address, the first data segments, and the second bit width of the second data, the second address, and the second data segments, wherein the third data comprises only a bit of the second data that is not used by the first data; and
writing the third data to the cache according to the at least one index and the at least one tag.

6. A data bit width converter, adapted to: convert first data using a first bit width as a data segment unit and second data using a second bit width as a data segment unit, and provide a cache to temporarily store third data, wherein the first bit width is not equal to the second bit width, and the data bit width converter comprises:
a slave, configured to read and write the second data;
a cache, configured to read and write the third data; and
a data reconstitution circuit, configured to: convert the first data and the second data, and sequentially search the cache and the slave for the second data according to a searching program, to output the first data, and write the third data to the cache according to a temporary storage program, wherein after the second data is converted into the first data, a remaining part of the second data is the third data.

7. The data bit width converter according to claim 6, further comprising a master, configured to output a control instruction to the data reconstitution circuit to obtain the first data.

8. The data bit width converter according to claim 7, wherein the searching program comprises:

obtaining a plurality of indexes and a plurality of tags according to the first bit width of the first data, a first address, the number of first data segments, and the second bit width of the second data, a second address, and the number of second data segments; and
searching the cache for the second data according to the indexes and the tags; if the complete second data is obtained, stopping the searching program, and otherwise, continuing to search the slave for the second data, wherein when any part of the second data is obtained from the cache, a block corresponding to the cache is erased.

9. The data bit width converter according to claim 8, wherein the temporary storage program comprises:
obtaining the third data and the corresponding at least one index and the at least one tag according to the first bit width of the first data, the first address, the first data segments, and the second bit width of the second data, the second address, and the second data segments, wherein the third data comprises only the second data segments that are not completely used by the first data; and
writing the third data to the cache according to the at least one index and the at least one tag.

10. The data bit width converter according to claim 8, wherein the temporary storage program comprises:
obtaining the third data and the corresponding at least one index and the at least one tag according to the first bit width of the first data, the first address, the first data segments, and the second bit width of the second data, the second address, and the second data segments, wherein the third data comprises only a bit of the second data that is not used by the first data; and
writing the third data to the cache according to the at least one index and the at least one tag.

* * * * *